Sept. 19, 1972     M. E. FRANK ET AL     3,692,498

CHEMICAL TESTING APPARATUS

Filed Oct. 12, 1970

INVENTOR

MORTON E. FRANK

BY *Zalkind, Hornes & Shuster*

ATTORNEYS

3,692,498
Patented Sept. 19, 1972

3,692,498
CHEMICAL TESTING APPARATUS
Morton E. Frank, Dix Hills, N.Y. (% Lab-Aids, Incorporated, 160 Rome St., Farmingdale, N.Y. 11735); Jesse Gross, Plainview, N.Y. 11803; and Sol Lesh, New Hyde Park, N.Y. 11040
Filed Oct. 12, 1970, Ser. No. 79,763
Int. Cl. B01l 3/00, 5/02; G01n 1/28
U.S. Cl. 23—292
8 Claims

ABSTRACT OF THE DISCLOSURE

Dimensionally identical recesses in a molded plastic body are adapted to receive drop quantities of chemical ingredients. Any of the recesses may receive a funnel member to seal a chamber from which gas generated by chemical reaction may be conducted through flexible tubing for collection or delivery to an adjacent recess.

Chemical test plates having relatively small depressions for receiving drop quantities of reactive ingredients are well known. However, such devices are limited in use insofar as chemical testing is concerned. Other testing equipment of considerable expense and unsuitable for drop quantity testing, must be used. It is therefore an important object of the present invention to provide economically fabricated apparatus for drop quantity chemical testing purposes, which will have a greater independent testing capability as well as to facilitate testing in general.

In accordance with the present invention, a test plate or spot plate body is provided with a plurality of hemispherical recesses of identical dimension for receiving, with a force fit, a funnel member. A gas tight chamber is thereby enclosed in any recess by the funnel member in order to facilitate the collection and/or delivery of gas generated in such chamber by chemical reaction between ingredients deposited into the recess. The gas is conducted through an outlet in the funnel member and an attached conduit in the form of a flexible tubing section to a collection chamber or into an adjacent recess containing a testing liquid, for example.

For further understanding of the invention, reference is now made to the attached drawing wherein.

Figure 1:
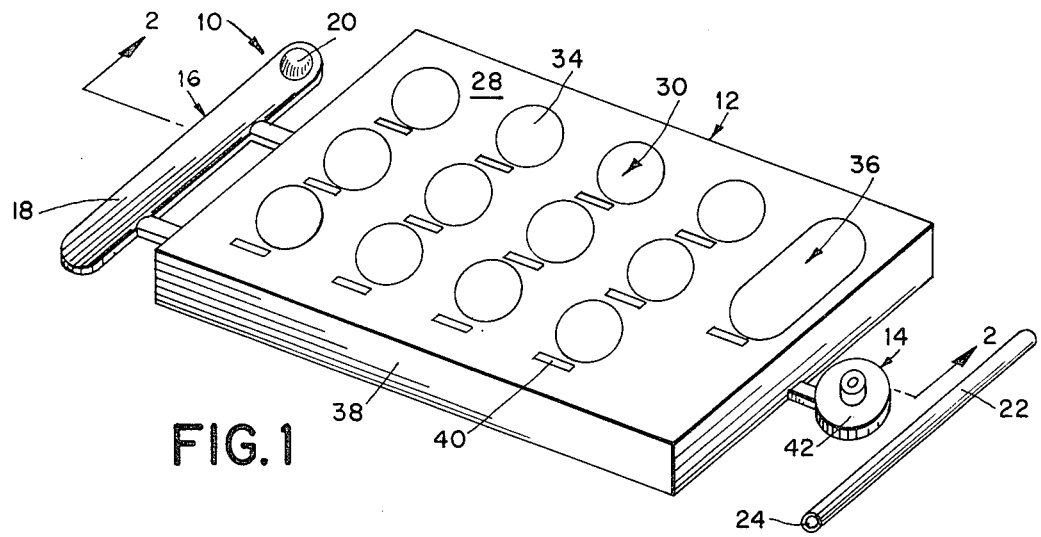
FIG. 1 is a perspective view showing the molded parts forming the apparatus of the present invention.

Referring now to the drawings in detail, FIG. 1 illustrates a molded unit generally denoted by reference numeral 10 made of any suitable plastic. The unit includes a relatively thin walled body 12 to which a funnel member 14 is detachably connected for molding therewith in one piece. Also detachably connected to the body is a mixing spatula having a thin, elongated shank 18 formed with a protuberance 20 at the mixing end. The molded unit 10 is to be marketed together with a section of flexible tubing open at opposite ends 24.

Figure 2:
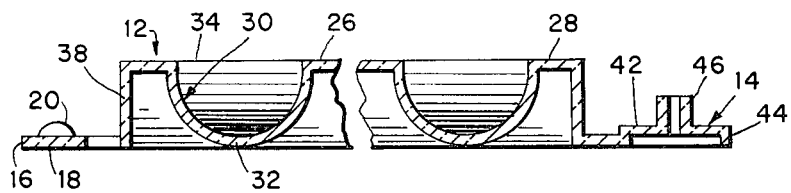
FIG. 2 is an enlarged partial side sectional view taken substantially through a plane indicated by section line 2—2 in FIG. 1.

The body 12 includes a top planar wall portion 26 as more clearly seen in FIG. 2 presenting a flat working surface 28 within which a plurality of recesses 30 of identical dimensions are formed. These recesses are defined by hemispherical formations 32 depending from the top planar portion 26 of the body forming circular openings 34 in the working surface 28. In the illustrated embodiment as shown in FIG. 1, there are twelve recesses 30. However, any number of recesses may be provided depending on size and consumer requirements. One or more larger and elongated recesses, such as recess 36 may also be formed in the body to suit different requirements.

The body is also formed with a peripheral skirt 38 depending from the top wall portion 26 for support of the material receiving recesses 30 and 36 on a level surface. The working surface 28 may also bear indicia or writing surface portions 40 as shown in FIG. 1 for a labeling and identifying each of the recesses. The funnel member 14 and spatula may be detached from the lower edge of the skirt for use of the apparatus.

The funnel member 14 as more clearly seen in FIG. 2 includes a disc portion 42 bordered by a circular rim 44 having an outer diameter substantially equal to the diameter of the openings 34 into the recesses 30. Accordingly, the funnel member may be inserted into the opening of any of the recesses 30 with a force fit so as to seal a gas tight chamber therein. A gas outlet formation 46 projects from the disc portion of the funnel member and is adapted to be received within one open end of the flexible tubing section 22.

Figure 3:
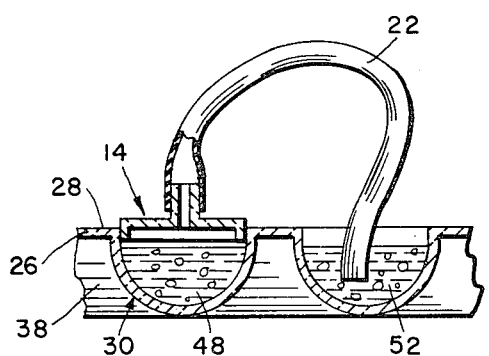
FIG. 3 is a partial side sectional view of the apparatus in one mode of use.
Figure 4:
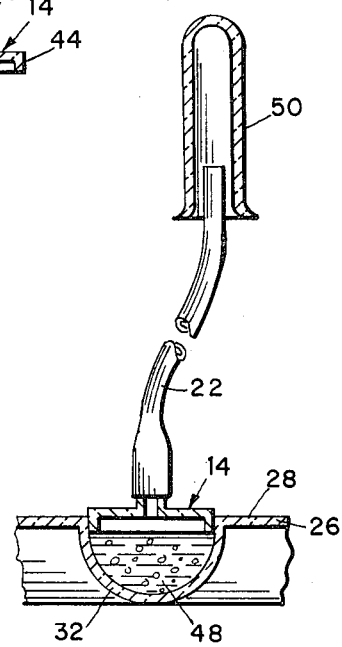
FIG. 4 is a partial side sectional view of the apparatus in another mode of use.

The flexible tubing section when applied to the funnel member outlet 46 will collect and conduct gases generated within any of the recess chambers sealed by the funnel member. Gases may be generated within any recess by chemical reaction between ingredients 48 placed therein as shown in FIGS. 3 and 4. The gas generated within the sealed recess chamber may be delivered by the tubing section 22 to an adjacent recess as shown in FIG. 3 or collected within an inverted test tube 50 as shown in FIG. 4.

By way of example, the foregoing apparatus may be useful in facilitating the collection of hydrogen gas by mixing zinc and hydrochloric acid in a recess chamber sealed by the funnel member. Carbon dioxide gas may be similarly produced in a sealed recess chamber by mixing of calcium carbonate and hydrochloric acid. The carbon dioxide gas could then be tested by delivering the gas through the tubing 22 into a liquid 52 such as limewater within an adjacent recess as shown in FIG. 3. Thus, the apparatus will be ideally suited for students performing chemical tests and analysis by depositing drop quantities of ingredients in the recesses 30 which will be appropriately labeled. Drop quantity titrations may be easily performed in the larger recess 36.

What is claimed is:

1. In combination with a spot plate including a material holding body having a working surface provided with a plurality of receptacle recesses, at least one funnel member sealingly received in a selected one of the recesses to enclose a chamber, and conduit means connected to said funnel member for conducting fluid from said chamber.

2. The combination of claim 1, wherein said funnel member comprises a disc portion having an outlet formation projecting therefrom and a circular rim portion dimensioned for tight fit reception in the selected one of the recesses.

3. The combination of claim 2, wherein said conduit means comprises a flexible tube having opposite open ends, one of said ends being mounted on said outlet formation of the funnel member and the other end adapted to be inserted into said other of the recesses.

4. The combination of claim 1, wherein said conduit means includes a flexible tube connected to the funnel member.

5. The combination of claim 4, wherein said body includes a planar portion forming said working surface and a plurality of formations depending therefrom to enclose the recesses, said recesses being generally hemispherical in shape to form circular openings in said working surface.

6. The combination of claim 1, wherein said body includes a planar portion on which said working surface is formed and a plurality of formations depending therefrom to form the recesses, said recesses being generally hemispherical in shape to form circular openings in said working surface.

7. The combination of claim 6, wherein said funnel member comprises a disc portion having an outlet formation projecting therefrom and a circular rim portion dimensionally equal to said circular openings for tight fit reception.

8. The combination of claim 7, wherein said conduit means comprises a flexible tube having opposite open ends, one of said ends being mounted on said outlet formation of the funnel member and the other end adapted to be inserted into said other of the recesses.

References Cited

UNITED STATES PATENTS

| | | | |
|---|---|---|---|
| 3,348,921 | 10/1967 | Katz et al. | 23—292 X |
| 3,219,416 | 11/1965 | Natelson | 23—259 X |
| 3,319,792 | 5/1967 | Leder et al. | 23—292 X |
| 3,568,735 | 3/1971 | Lancaster | 23—259 X |
| 3,269,800 | 8/1966 | Lukrec | 23—259 |

MORRIS O. WOLK, Primary Examiner

E. A. KATZ, Assistant Examiner

U.S. Cl. X.R.

23—253 R, 259